(12) United States Patent
Bhosale et al.

(10) Patent No.: US 11,223,655 B2
(45) Date of Patent: Jan. 11, 2022

(54) SEMICONDUCTOR TOOL MATCHING AND MANUFACTURING MANAGEMENT IN A BLOCKCHAIN

(71) Applicant: International Business Machines Corporation, Armonk, NY (US)

(72) Inventors: Prasad Bhosale, Albany, NY (US); Nicholas A. Lanzillo, Troy, NY (US); Michael Rizzolo, Albany, NY (US); Chih-Chao Yang, Glenmont, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/101,740

(22) Filed: Aug. 13, 2018

(65) Prior Publication Data

US 2020/0053128 A1 Feb. 13, 2020

(51) Int. Cl.
*H04L 29/06* (2006.01)
*H04L 9/32* (2006.01)
*H04L 9/08* (2006.01)
*G06F 21/64* (2013.01)

(52) U.S. Cl.
CPC .............. *H04L 63/20* (2013.01); *G06F 21/64* (2013.01); *H04L 9/0816* (2013.01); *H04L 9/3236* (2013.01); *H04L 9/3247* (2013.01); *H04L 2209/38* (2013.01)

(58) Field of Classification Search
CPC ..... H04L 63/20; H04L 9/0816; H04L 9/3236; H04L 9/3247; H04L 2209/38; H04L 21/64; H04L 63/123; H04L 9/0891; H04L 9/3239; G06F 21/64
See application file for complete search history.

(56) References Cited

U.S. PATENT DOCUMENTS

| | | | |
|---|---|---|---|
| 10,171,992 B1 * | 1/2019 | Viswanathan | H04W 8/28 |
| 10,373,159 B2 * | 8/2019 | Ardashev | G06Q 50/18 |
| 10,448,251 B1 * | 10/2019 | Maria | H04L 9/3239 |
| 10,547,687 B2 * | 1/2020 | Lotter | H04L 67/125 |
| 10,616,324 B1 * | 4/2020 | Kaddoura | H04L 69/329 |
| 10,652,239 B2 * | 5/2020 | Jentzsch | H04L 63/101 |
| 10,671,733 B2 * | 6/2020 | Baker | H04L 9/3236 |
| 10,679,215 B2 * | 6/2020 | Kurian | G06Q 20/3227 |
| 10,698,997 B2 * | 6/2020 | Li | H04L 63/083 |
| 10,713,654 B2 * | 7/2020 | Dillenberger | G06F 16/27 |
| 10,715,312 B2 * | 7/2020 | Sundaresan | H04L 9/0637 |

(Continued)

OTHER PUBLICATIONS

Peilin Zheng, et al., EtherShare Share Information in JointCloud Environment Using Blockchain-Based Smart Contracts, Apr. 4-9, 2019, 2019 IEEE International Conference on Service-Oriented System Engineering (SOSE), pp. 1-6.*

*Primary Examiner* — Farid Homayounmehr
*Assistant Examiner* — Suman Debnath

(57) ABSTRACT

An example operation may include one or more of identifying a current tool configuration used by a tool device to construct semiconductor devices, retrieving a smart contract stored in a blockchain to identify whether an updated tool configuration exists, responsive to identifying the updated tool configuration, transmitting an update that includes the updated tool configuration to the tool device, and responsive to receiving the updated tool configuration at the tool device, initiating construction of the semiconductor devices.

20 Claims, 10 Drawing Sheets

(56) References Cited

U.S. PATENT DOCUMENTS

| | | | |
|---|---|---|---|
| 2011/0127679 A1* | 6/2011 | Eun | H01L 25/105 |
| | | | 257/774 |
| 2014/0143006 A1* | 5/2014 | Chang | G06Q 10/06315 |
| | | | 705/7.25 |
| 2015/0332283 A1 | 11/2015 | Witchey | |
| 2016/0275461 A1 | 9/2016 | Sprague et al. | |
| 2017/0046651 A1 | 2/2017 | Lin et al. | |
| 2017/0091397 A1 | 3/2017 | Shah | |
| 2017/0213209 A1* | 7/2017 | Dillenberger | G06Q 20/3825 |
| 2017/0243208 A1* | 8/2017 | Kurian | G06Q 20/40 |
| 2017/0289731 A1* | 10/2017 | Kamineni | H04W 4/60 |
| 2018/0088928 A1* | 3/2018 | Smith | G06F 8/65 |
| 2018/0096175 A1 | 4/2018 | Schmeling et al. | |
| 2018/0191714 A1* | 7/2018 | Jentzsch | H04L 63/101 |
| 2018/0248685 A1* | 8/2018 | O'Brien | H04L 63/0876 |
| 2019/0052544 A1* | 2/2019 | Sharma | G06F 21/577 |
| 2019/0253247 A1* | 8/2019 | Sika | H04L 9/3239 |
| 2019/0306173 A1* | 10/2019 | Reddy | H04L 63/126 |
| 2019/0378352 A1* | 12/2019 | Dey | G07C 5/0841 |
| 2020/0034813 A1* | 1/2020 | Calinog | G06Q 20/22 |
| 2020/0050595 A1* | 2/2020 | Sun | H04L 9/3239 |
| 2020/0097862 A1* | 3/2020 | Arora | H04L 63/00 |

\* cited by examiner

SEMICONDUCTOR TOOL MATCHING AND MANUFACTURING MANAGEMENT IN A BLOCKCHAIN

TECHNICAL FIELD

This application generally relates to semiconductor manufacturing, and more particularly, to providing information services for semiconductor tool matching and manufacturing management in a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, semiconductor manufacturing is a delicate process vulnerable to errors in manufacturing, such as tool selections, product specifications, processes and procedures used at different locations, etc. Any and all of those manufacturing requirements can be points of failure when manufacturing efforts are assigned to different sites. User error is also a concern, as the tool selection parameters, material selection, manufacturing processes, etc., can be different on any given day at any given manufacturing site. The expectations of one manufacturer may not be met by another as the exact processes and conditions will vary and are not always specified since the list of considerations can be complicated and lengthy. Moreover, a root cause of failure may be undetectable leading to more losses in manufacturing resources.

SUMMARY

One example embodiment may provide a method that includes one or more of identifying a current tool configuration used by a tool device to construct semiconductor devices, retrieving a smart contract stored in a blockchain to identify whether an updated tool configuration exists, responsive to identifying the updated tool configuration, transmitting an update comprising the updated tool configuration to the tool device, and responsive to receiving the updated tool configuration at the tool device, initiating construction of the semiconductor devices.

Another example embodiment may include a system that includes a tool device, and a computing node configured to identify a current tool configuration used by the tool device to construct semiconductor devices, retrieve a smart contract stored in a blockchain to identify whether an updated tool configuration exists, responsive to the identification of an updated tool configuration, transmit an update comprising the updated tool configuration to the tool device, and responsive to the updated tool configuration being received at the tool device, initiate construction of the semiconductor devices at the tool device.

Still another example embodiment may include a non-transitory computer readable storage medium configured to store instructions that when executed cause a processor to perform one or more of identifying a current tool configuration used by a tool device to construct semiconductor devices, retrieving a smart contract stored in a blockchain to identify whether an updated tool configuration exists, responsive to identifying the updated tool configuration, transmitting an update comprising the updated tool configuration to the tool device, and responsive to receiving the updated tool configuration at the tool device, initiating construction of the semiconductor devices.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide a transaction ledger based on a blockchain infrastructure. A blockchain may provide a shared ledger to log semiconductor tool information, recipe information, machine constants, control limits, consumables, etc. The ledger can be maintained for all such parameters, changes and recipe transfers through private and consensus-driven blockchain-linked tool and parameter based computers. Any failures, changes and other parameter modifications may be identified and tracked according to time and entry in the blockchain. Tools may represent processing entities with feedback systems, such as computers configured with sensors and other measurement equipment necessary to monitor conditions and identify various data parameters used in accordance with machine building efforts.

Figure 1:
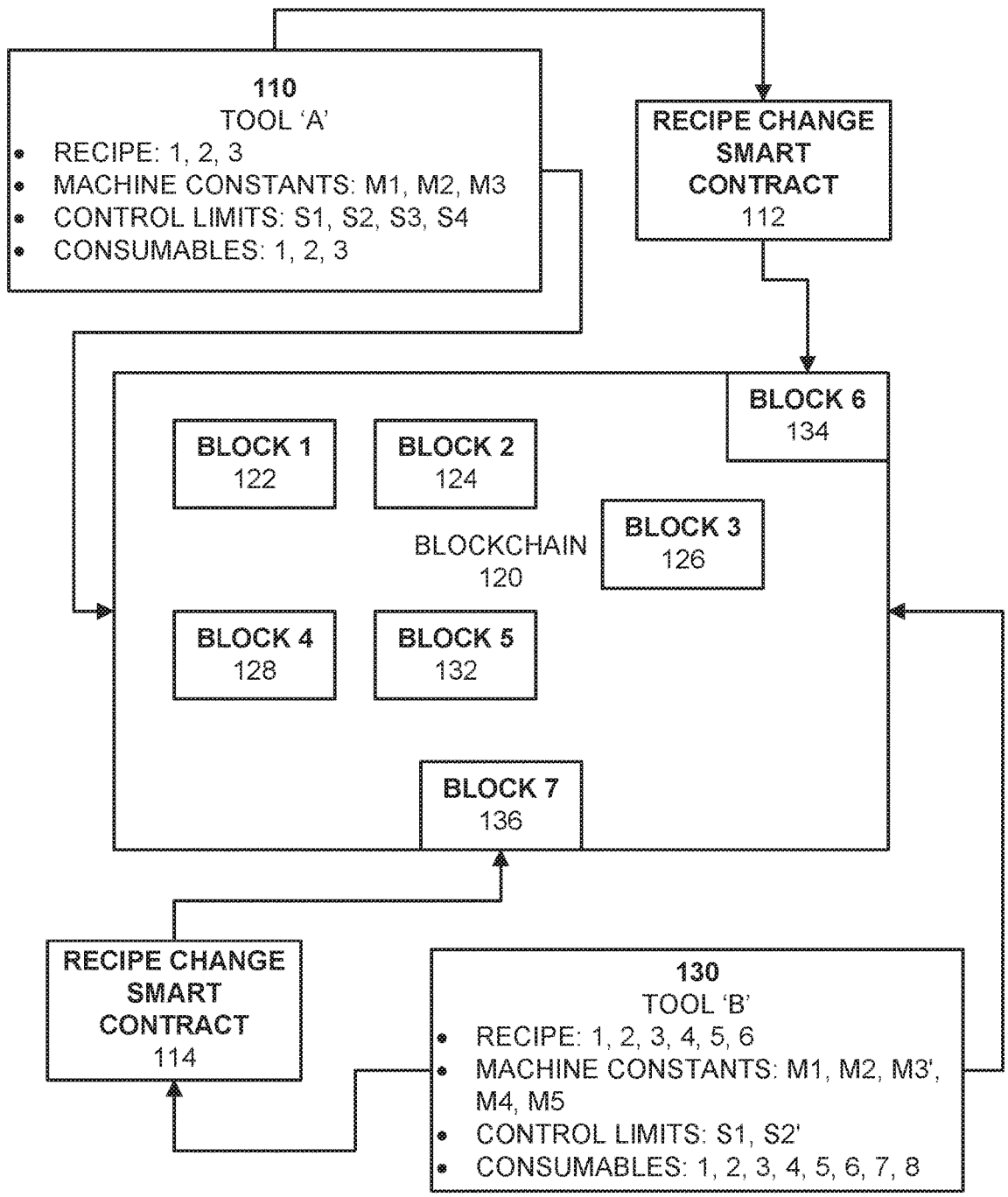
FIG. 1 illustrates a logic configuration of semiconductor tool processing platform operating with a blockchain network, according to example embodiments.

FIG. 1 illustrates a logic configuration of a semiconductor tool processing platform operating with a blockchain network, according to example embodiments. Referring to FIG. 1, the configuration 100 includes a blockchain 120, which provides a continuously updating ledger that represents the changes, modifications, error logging and other information related to the semiconductor manufacturing processes. For example, tool 'A' 110 represents a tool device, such as a computer operated machine that has a processor, memory, sensors and manufacturing equipment necessary to create semiconductor devices. The tool device 110 may receive as input recipes 1, 2, 3, etc., machine constants M1, M2, M3, etc., control limits S1, S2, S3 and S4 and consumables, such as physical components 1, 2 and 3 which are added to the manufacturing platform. The recipe used to dictate the process of manufacturing may be stored in a smart contract 112, which is added as a block 134 to the blockchain 120. Other blocks 122-132 may have been already stored, and may be overwritten by adding new blocks or may be complementary to the new blocks in a manner where the blocks are referenced for other information needed to complete a manufacturing cycle. The other tool device 'B' 130 may be a machine operating in another part of the world, but which is connected to the same blockchain network as part of a common manufacturing venture. The recipes and other parameters of tool 'B' 130 may be different from those of tool 'A' 110. The recipe of tool 'B' may be stored in a smart contract 114 and added as a new block 136 to the blockchain 120. Compliance from one tool device to another may be needed in order to ensure seamless manufacturing of semiconductor devices while reducing the likelihood of errors.

According to example embodiments, a smart contract is created when a user profile is identified as having activated the smart contract to implement a change in machine constants or recipe parameters since a last set of known parameters which is currently the active set and which is subject to change based on the newly identified changes which will be identified as the new tool device configuration. The new smart contract and the new tool device configuration will have machine constants and parameters which are required for use by the tool device. Certain criteria for making a change may include an output quality/quantity improvement that is being tracked. If a change permits the improvement, then the change will be permanent. Other information in the smart contract may include contact information of parties involved and their personal tokens.

A new blockchain transaction may be created and committed response to a scan being performed that retrieves machine constants and processes recipe parameters from the tool and compares periodically a hash of current data with a hash of a previously approved set of machine and process parameters. Another consideration for a new blockchain transaction being created is whenever a tool machine's constants or process recipes and parameters, that control the machine are altered, then a blockchain update transaction will need to be created that compares the hash of all such data with a previously approved version of the hash data. If the hash function do not match, the smart contract may be configured to reject the change or permit a user profile to create a new smart contract term(s) and request implementation of the change to the authorities or peers of the blockchain. If the smart contract is approved, then the change will be implemented and the hash function will be updated accordingly as the new blockchain build configuration data.

Figure 2A:
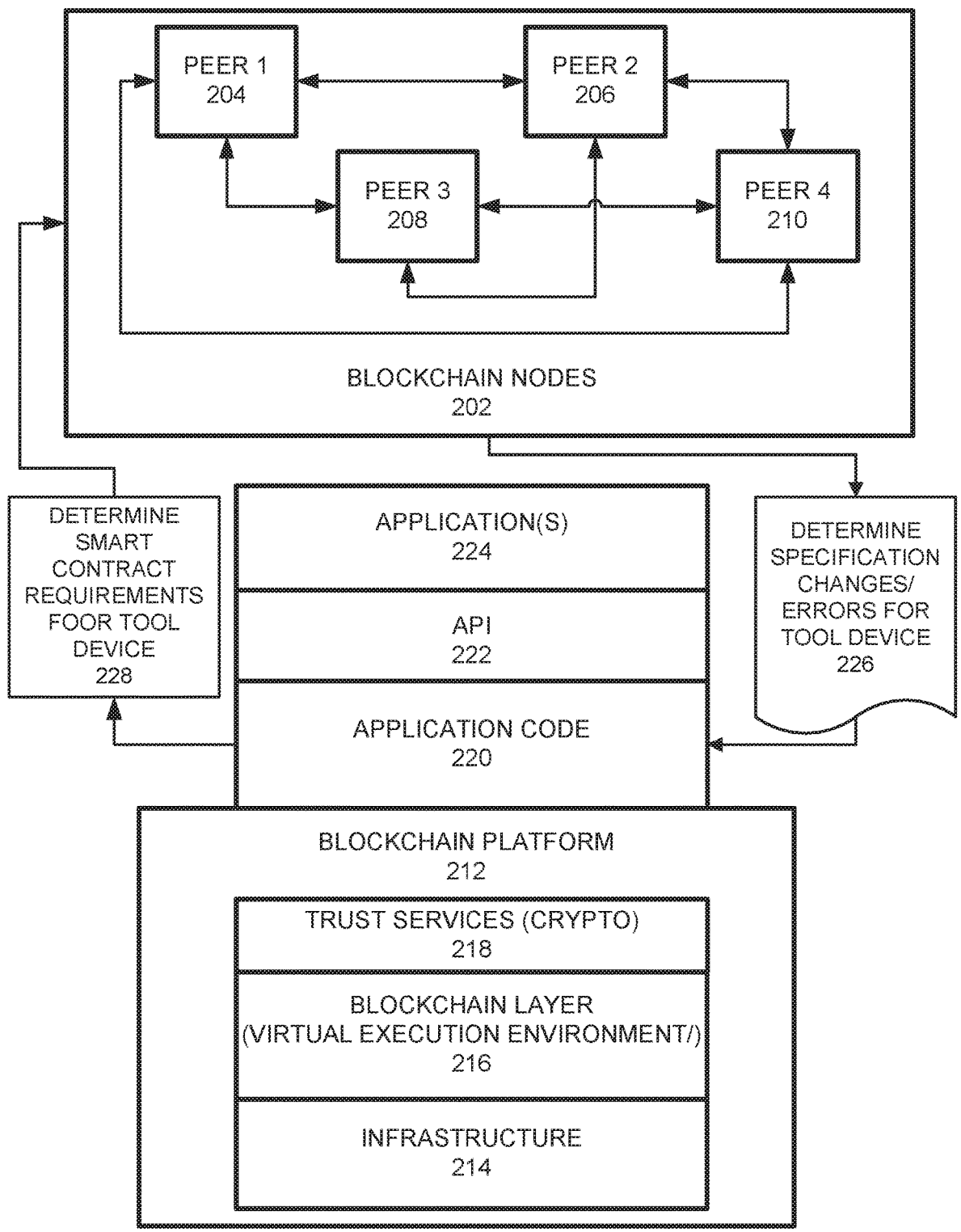
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain specification data, changes, errors, etc., and other data may be identified and analyzed for compliance with the smart contracts existing for those tool devices. The values can be exported to a smart contract and used to manage the manufacturing of the devices 226. Once the information is identified and the updated values are confirmed, the smart contract and/or other types of approval may be executed to solidify the current manufacturing process 228 so the entities managing those tool devices can identify the exact approach taken to ensure compliance during manufacturing. The smart contract may specify the tool device parameters required to be included in the blockchain transaction and thus the peers 202 may identify such information prior to permitting the procedures to be performed.

Figure 2B:
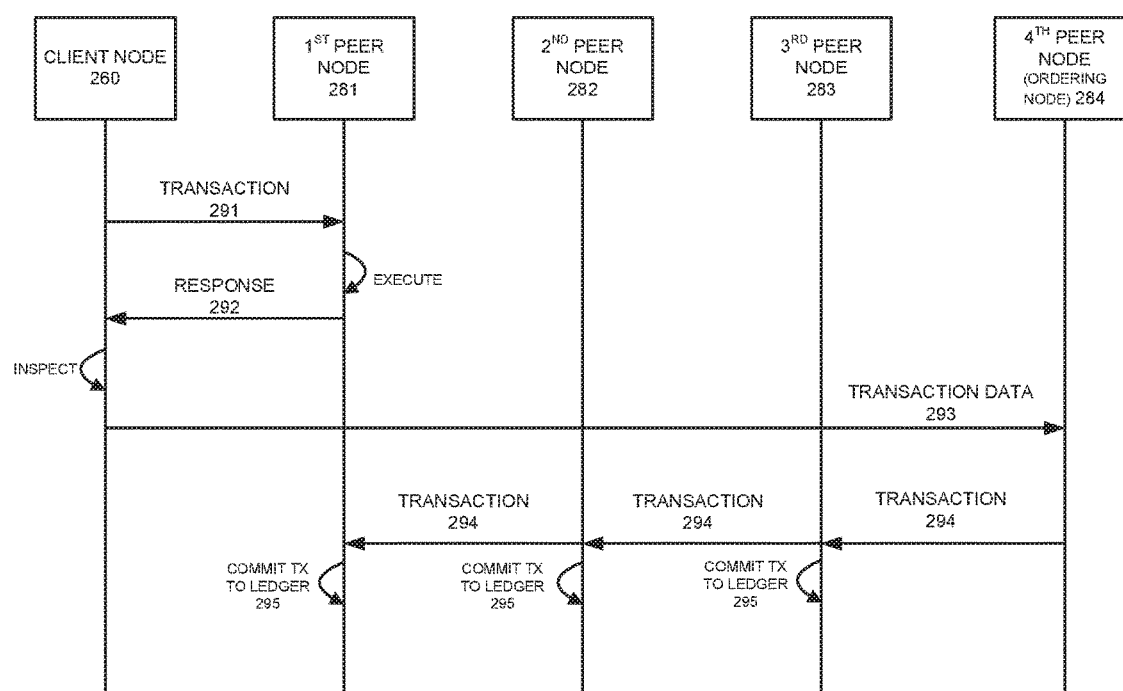
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
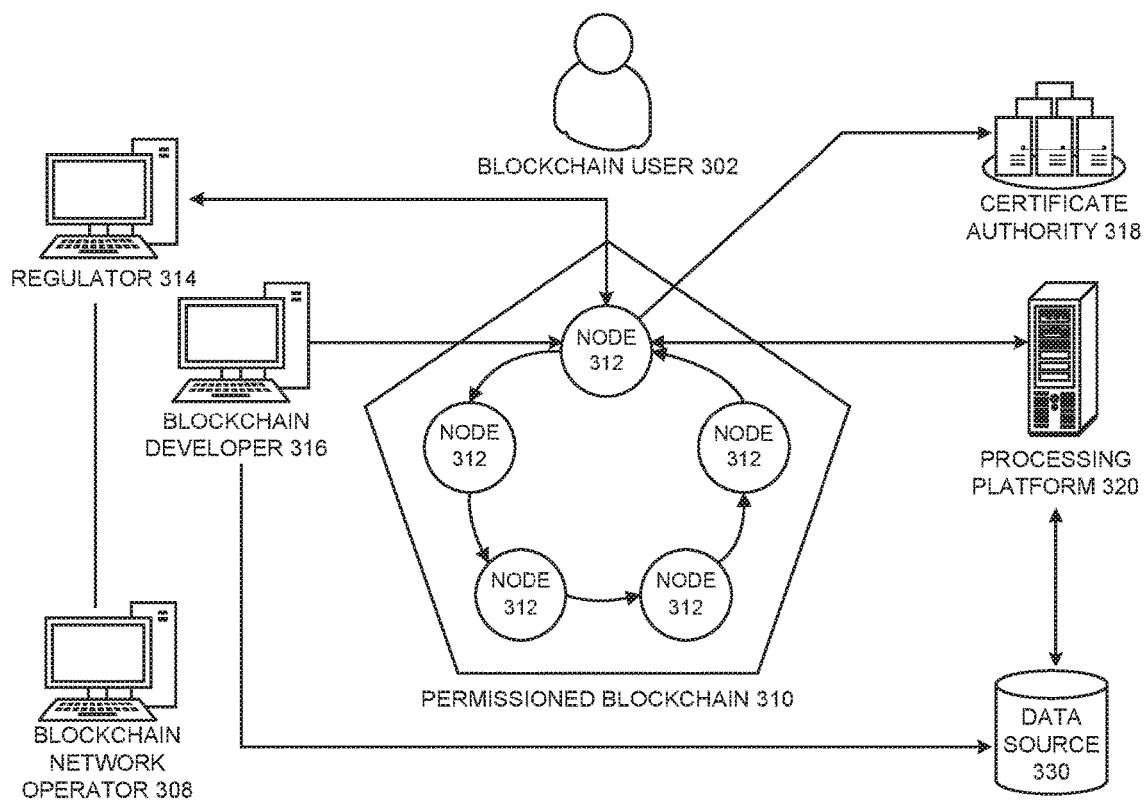
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

A manufacturing system may include one or more semiconductor unit process tools connected to each other by distributed network connections over the blockchain to share a ledger containing all the parameters changes and recipe transfers through a private consensus driven blockchain. Each tool may contain a computer processor, a non-volatile computer-readable memory, a scanner configured to read data from barcodes on consumables used, a sensors system to measure key physical and chemical parameters, such as temperature, pressure, flow rate, pH, concentration etc. The tools may also include a device to capture physical changes made to the corresponding mechanical systems used during manufacturing. The blockchain will be used to track not only materials used but process conditions used in chip manufacturing, packaging and assembly. Recipe/parameter data from the blockchain can be identified to be authentic, reliable and secure and this would be used to identify any root causes of failures by matching configuration between two separate tool devices, predicting potential life time and failure of chips which are manufactured.

In the example of two separate manufacturing machines, such as tool device 'A' and tool device 'B', those devices may be remote and may be required to perform equivalently even though they are located in different parts of the world and maintained/used by different users. A common blockchain will be used to ensure sure a key process and recipe parameters are matched between those machines. A single manufacturing tool contains hundreds or thousands of parameters. Currently, such systems require manual comparison and matching of those parameters. If a change is implemented, all the parties involved need to be notified that such a change has been made.

The blockchain configuration may provide a smart contract to initiate and implement changes through secure and trusted users, undo a change that is not authorized, revert back to an older version if all parties involved approve the change, prevent accidental changes in parameters through human errors, and permit operation of tool in different modes, such as in high volume production, low volume production, stand-by, maintenance mode, etc., and while warranting a certain level of quality since each time any machine mode changes, the machine/process constants required for that change will be compared and maintained through blockchain transaction updates.

The tool devices may also include a non-volatile computer-readable memory that is configured with computer instructions configured to receive a private key and public key pair from a user profile ID used to manage those devices, receive unit process tool recipe/parameter data including one or more recipes/parameters for one or more user IDs referenced during such procedures. The user profile may be referenced to provide a private key to digitally sign the tool parameter/recipe data to produce signed data which is committed to the blockchain. This approach securely and accurately creates and provides a platform to transfer unit process tool recipes and other parameter data to the tool devices which receive such data produced by a user profile ID. In one example, a private key and public key pair corresponding to a user ID may be used to sign the current tool recipe/parameters. For example, the private key can be used to create signed data which is then stored with recipe/parameter data in a recipe/parameter transaction as part of a blockchain block on the recipe/parameter blockchain. In one consensus driven management approach, if more than 50% of the tool devices reject a proposed transaction recipe, then that transaction will not be accepted as part of the blockchain block and the transactions will be rejected. The public and private key pair would be used to securely sign and upload tool recipe/parameters to the blockchain network. The uploaded data will be signed by multiple authorized engineers (i.e., user profile IDs) at different sites using a smart contract. Once all the requirements of a smart contract are fulfilled this data will be uploaded to the recipe/parameter block. Multiple nodes in the network will verify uploaded data and the smart contract before committing the transaction to the blockchain. An engineer from another site could access blocks containing process data, which describe exactly what process conditions were used during manufacturing and/or packaging of chips. Data collected during manufacturing could be used to identify a root cause of failure, match configurations between two tools, predict potential life time and failure of chips, etc.

Figure 4:
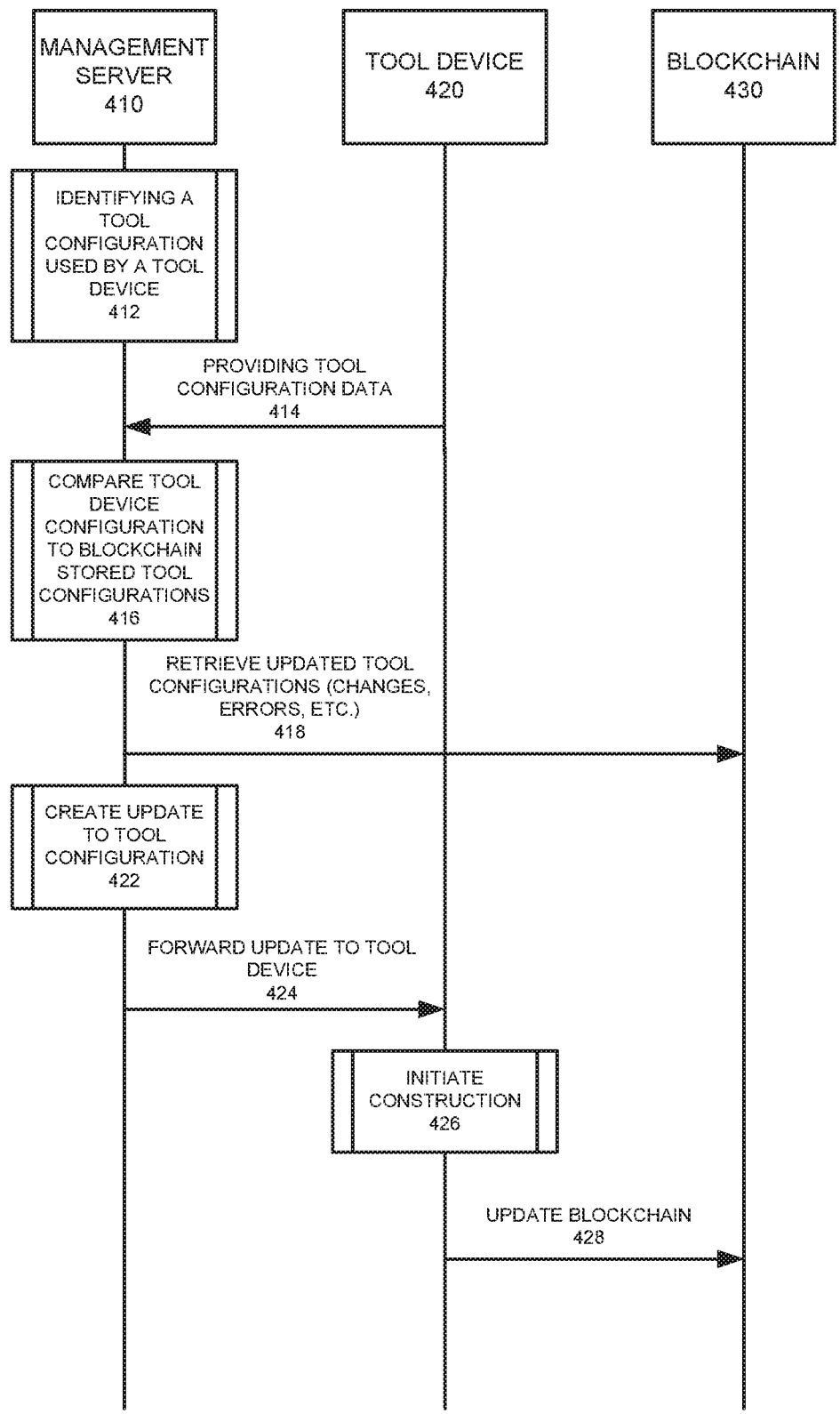
FIG. 4 illustrates a system messaging diagram for a semiconductor device creation configuration, according to example embodiments.

FIG. 4 illustrates a system messaging diagram for a semiconductor device creation configuration, according to example embodiments. Referring to FIG. 4, the system 400 provides a management server 410 operating as a management node for the tool device 420. The management server 410 may be a tool device itself operating as a leader of the blockchain to manage integrity and manufacturing processes. The process may include identifying a tool configuration 412 that is currently being used by a tool device 420. The tool configuration data may be sent 414 to the management server for reference purposes and to be compared against a blockchain stored configuration governed by requirements of a smart contract. The comparison 416 may identify changes from a current configuration and a more updated configuration stored in the blockchain. An updated tool configuration 418 can then be retrieved from the blockchain 430 so an update to the tool configuration can be identified 422 and forwarded 424 to the tool device 420. The tool device 420 can then initiate construction 426 and any results, changes, errors or other data can be sent 428 to the blockchain 430 as an updated transaction.

Figure 5A:
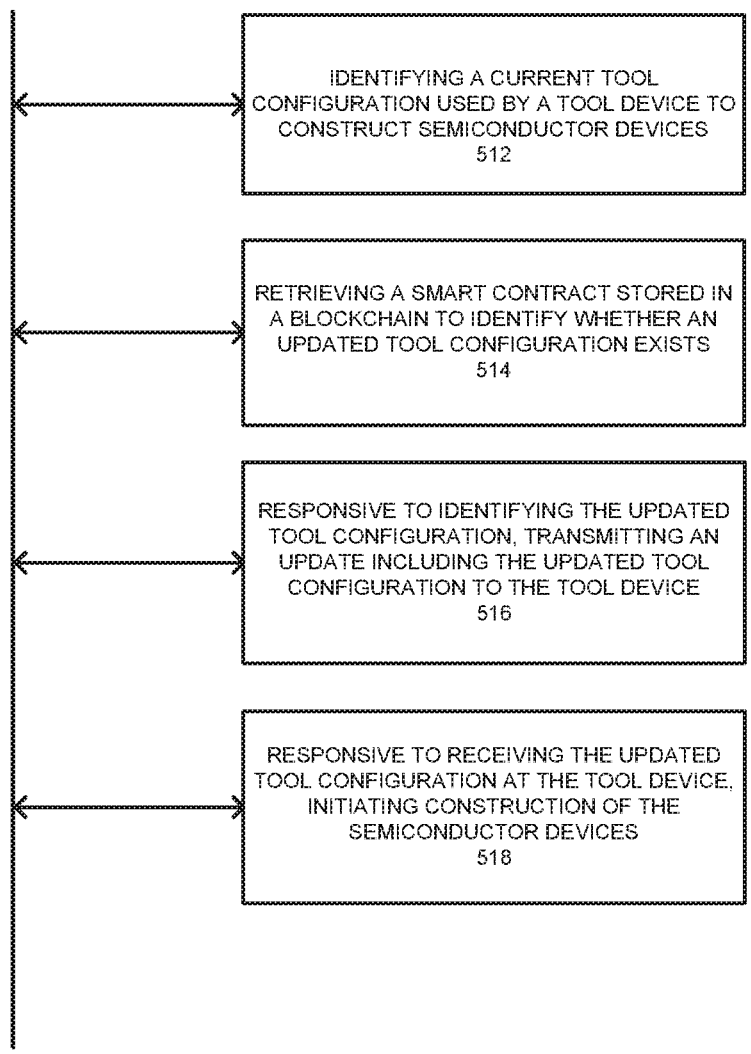
FIG. 5A illustrates a flow diagram of an example semiconductor device creation configuration, according to example embodiments.

FIG. 5A illustrates a flow diagram of an example semiconductor device creation configuration, according to example embodiments. Referring to FIG. 5A, the method 500 includes identifying a current tool configuration used by a tool device to construct semiconductor devices 512, retrieving a smart contract stored in a blockchain to identify whether an updated tool configuration exists 514, responsive to identifying the updated tool configuration, transmitting an update including the updated tool configuration to the tool device 516, and responsive to receiving the updated tool configuration at the tool device, initiating construction of the semiconductor devices 518.

The updated tool configuration includes changes to one or more of recipes, machine constants, control limits and consumables. The tool device includes a processor, a memory, a scanner, and sensors. The procedure for comparing the current tool configuration to another current tool configuration of another tool device at a remote location may also include determining any differences between the current tool configuration and the other current tool configuration, creating the updated tool configuration based on content of the current tool configuration and the other current tool configuration, and transmitting the updated tool configuration to the tool device and the other tool device. The method may also include receiving a private key and a public key pair from a user identifier associated with the tool device, and accessing the user identifier with the private key and public key pair to identify tool configuration parameters which includes recipes and parameters associated with operation of the tool device, and the tool configuration parameters are digitally signed by the private key and public key pair. The process may also provide executing the smart contract prior to operating the tool device, responsive to executing the smart contract, identifying changes to the current tool configuration from a blockchain transaction, updating the current tool configuration based on the changes identified, storing the updated tool configuration in the blockchain, identifying an error during the construction of the semiconductor devices via a sensor of the tool device, and creating a new blockchain transaction comprising the error information.

Figure 5B:
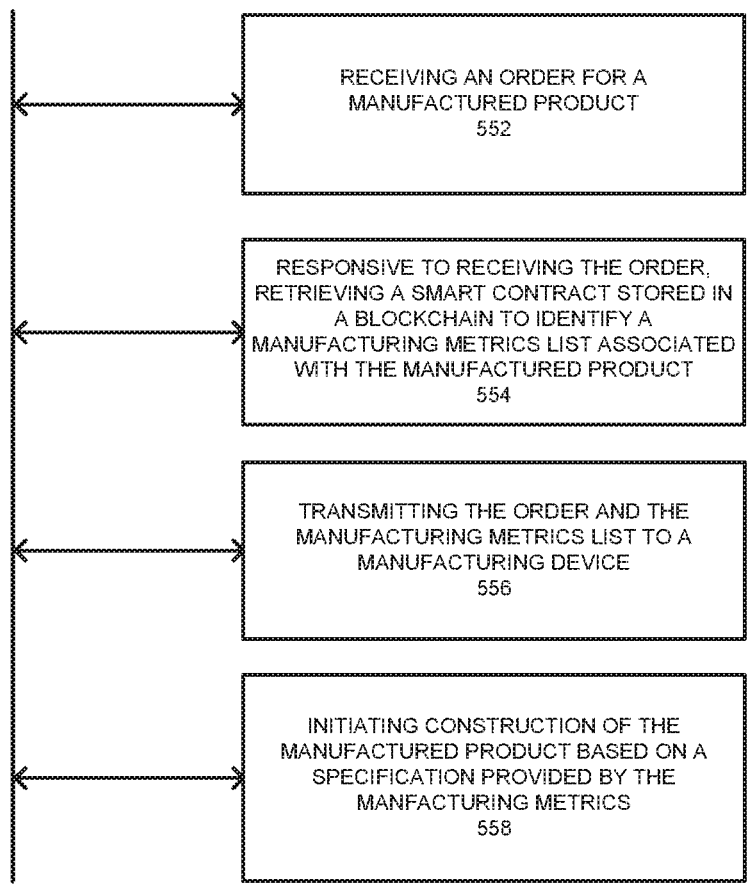
FIG. 5B illustrates a flow diagram of another example semiconductor device creation configuration, according to example embodiments.

FIG. 5B illustrates a flow diagram of another example semiconductor device creation configuration, according to example embodiments. Referring to FIG. 5B, the method 550 may include receiving an order for a manufactured product 552, responsive to receiving the order, retrieving a smart contract stored in a blockchain to identify a manufacturing metrics lists associated with the manufactured product 554, transmitting the order and the manufacturing metrics list to a manufacturing device 556, and initiating construction of the manufactured product based on a specification provided by the manufacturing metrics 558.

In addition to managing manufacturer specifications, the process of knowing when to produce a product may enable a smart contract to trigger chain codes that are based on orders. A new order for a product may trigger the smart contract to initiate manufacturing specifications to a machine that is suitable for creating the ordered product. For example, a consumer may specify colors, features, etc. The smart contract may identify the product codes and retrieve specifications necessary for a particular machine to then build to the product according to those specifications, such as size, color, add-ons, software builds, packaging, etc.

Figure 6A:
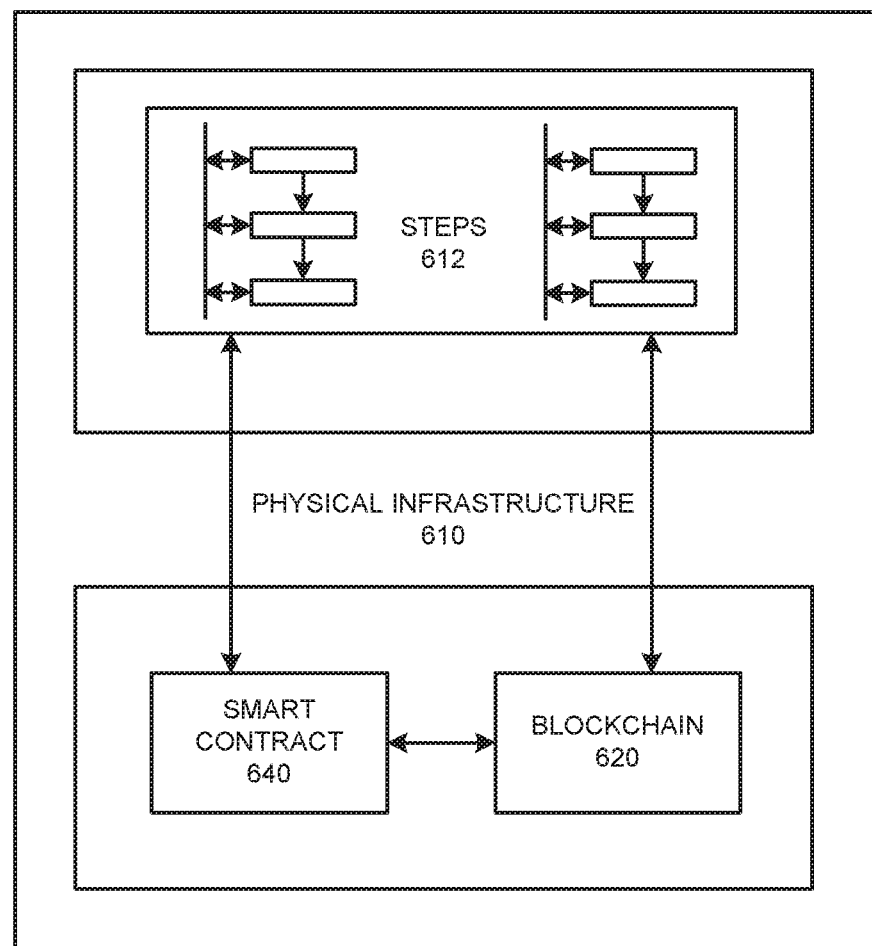
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
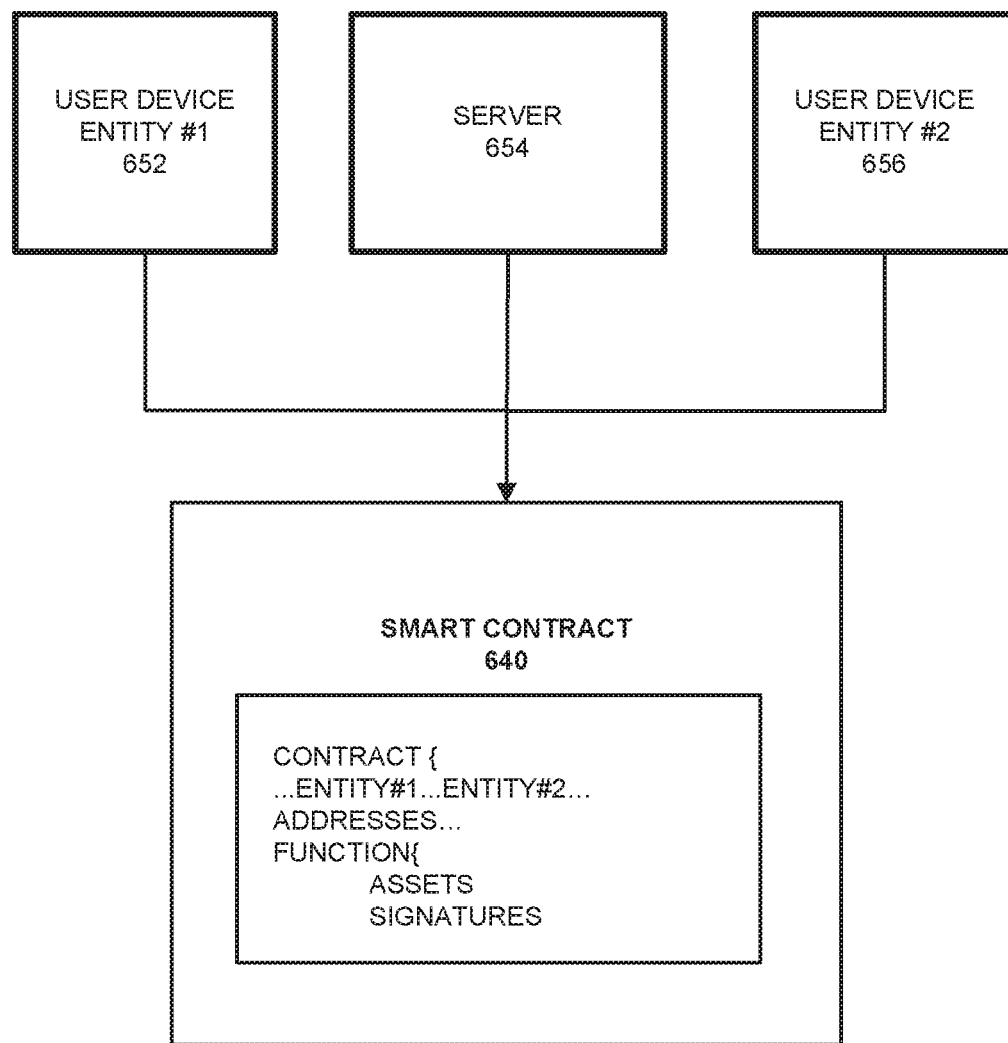
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
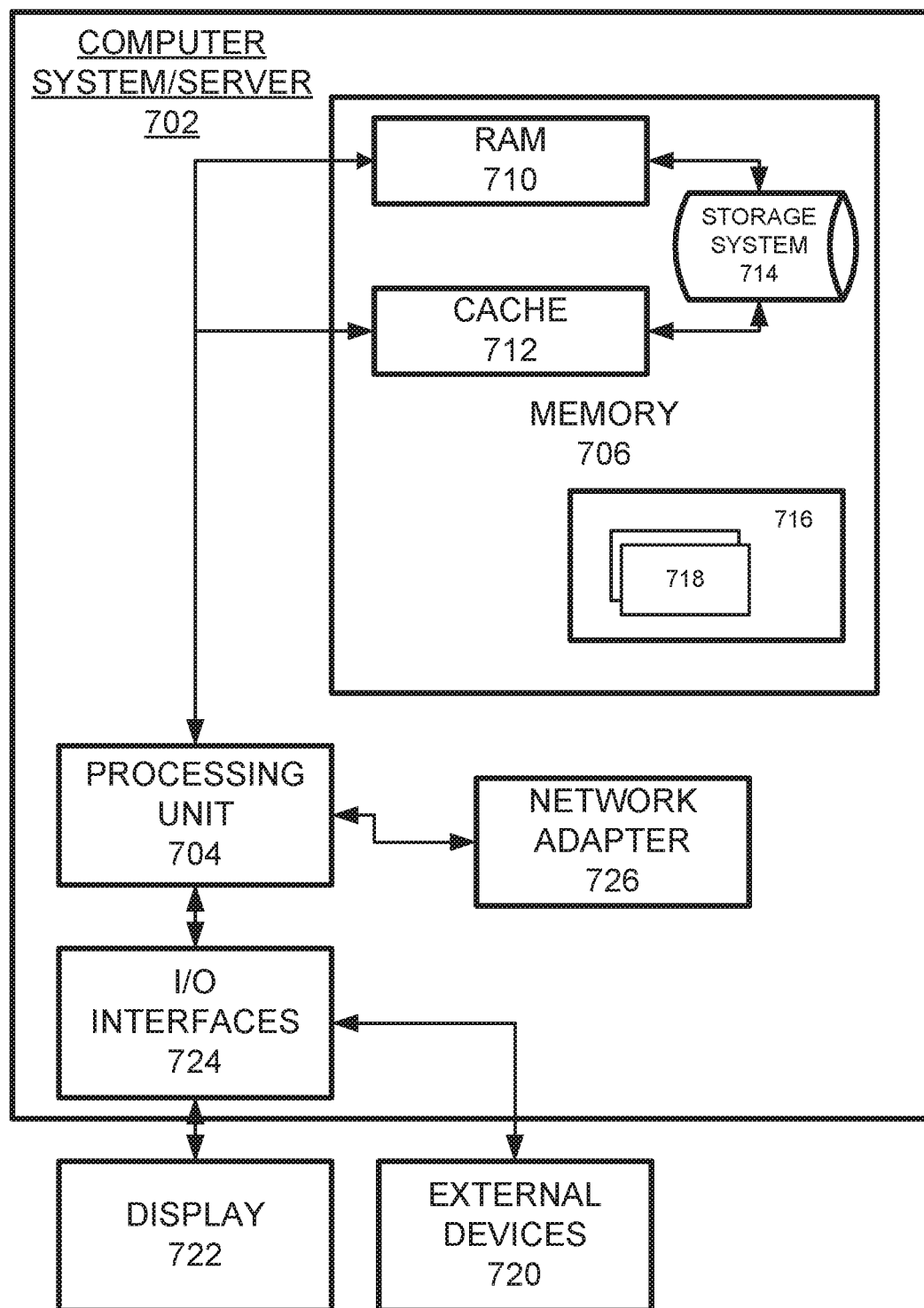
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving, by a hardware-implemented server, in a blockchain network, a current tool configuration from a tool device, of a plurality of tool devices in the blockchain network, the current tool configuration being used by the tool device to construct a semiconductor device;
    retrieving, by the hardware-implemented server, an updated tool configuration from a smart contract stored in a blockchain of the blockchain network, the updated tool configuration to be used by the tool device to construct the semiconductor device;
    transmitting, by the hardware-implemented server, a transaction comprising the updated tool configuration to the other tool devices of the plurality of tool devices for endorsement;
    receiving, by the hardware-implemented server, an endorsed transaction indicating that a majority of the other tool devices have endorsed the updated tool configuration;
    transmitting, by the hardware-implemented server, the updated tool configuration to the tool device for use in construction of the semiconductor device.

2. The method of claim 1, wherein the updated tool configuration comprises changes to one or more of:

recipes, machine constants, control limits, and consumables.

3. The method of claim 1, wherein the tool device comprises:
a processor, a memory, a scanner, and sensors.

4. The method of claim 1, further comprising:
comparing the current tool configuration to another current tool configuration of another tool device at a remote location;
determining any differences between the current tool configuration and the another current tool configuration;
creating the updated tool configuration based on content of the current tool configuration and the another current tool configuration; and
transmitting the update tool configuration to the tool device and the another tool device.

5. The method of claim 1, further comprising:
receiving a private key and a public key pair from a user identifier associated with the tool device; and
accessing the user identifier with the private key and public key pair to identify tool configuration parameters comprising recipes and parameters associated with operation of the tool device, wherein the tool configuration parameters are digitally signed by the private key and public key pair.

6. The method of claim 1, further comprising:
executing the smart contract prior to operating the tool device;
responsive to executing the smart contract, identifying changes to the current tool configuration from a blockchain transaction;
updating the current tool configuration based on the changes identified; and
storing the updated tool configuration in the blockchain as an updated blockchain transaction.

7. The method of claim 1, further comprising:
identifying an error during the construction of the semiconductor devices via a sensor of the tool device;
creating a new blockchain transaction comprising the error; and
storing the new blockchain transaction in the blockchain.

8. A node in a blockchain network, the node comprising:
a memory storing one or more instructions and
a processor that when executing the one or more instructions is configured to:
receive a current tool configuration from a tool device, of a plurality of tool devices in the blockchain network, the current tool configuration being used by the tool device to construct a semiconductor device;
retrieve, an updated tool configuration from a smart contract stored in a blockchain of the blockchain network, the updated tool configuration to be used by the tool device to construct the semiconductor device;
transmit, a transaction comprising the updated tool configuration to the other tool devices of the plurality of tool devices for endorsement;
receive, an endorsed transaction indicating that a majority of the other tool devices have endorsed the updated tool configuration;
transmit, the updated tool configuration to the tool device for use in construction of the semiconductor device.

9. The system of claim 8, wherein the updated tool configuration comprises changes to one or more of:
recipes, machine constants, control limits and consumables.

10. The system of claim 8, wherein the tool device comprises:
a processor, a memory, a scanner, and sensors.

11. The system of claim 8, wherein the computing node is further configured to:
compare the current tool configuration to another current tool configuration of another tool device at a remote location;
determine any differences between the current tool configuration and the another current tool configuration;
create the updated tool configuration based on content of the current tool configuration and the another current tool configuration; and
transmit the update tool configuration to the tool device and the another tool device.

12. The system of claim 8, wherein the computing node is further configured to:
receive a private key and a public key pair from a user identifier associated with the tool device; and
access the user identifier with the private key and public key pair to identify tool configuration parameters comprising recipes and parameters associated with operation of the tool device, wherein the tool configuration parameters are digitally signed by the private key and public key pair.

13. The system of claim 8, wherein the computing node is configured to:
execute the smart contract prior to operating the tool device;
responsive to the smart contract being executed, identify changes to the current tool configuration from a blockchain transaction;
update the current tool configuration based on the changes identified; and
store the updated tool configuration in the blockchain as an updated blockchain transaction.

14. The system of claim 8, wherein the computing node is further configured to:
identify an error during the construction of the semiconductor devices via a sensor of the tool device;
create a new blockchain transaction comprising the error; and
store the new blockchain transaction in the blockchain.

15. A non-transitory computer readable storage medium configured to store one or more instructions that when executed by a processor of a server in a blockchain network cause the processor to perform:
receiving a current tool configuration from a tool device, of a plurality of tool devices in the blockchain network, the current tool configuration being used by the tool device to construct a semiconductor device;
retrieving an updated tool configuration from a smart contract stored in a blockchain of the blockchain network, the updated tool configuration to be used by the tool device to construct the semiconductor device;
transmitting a transaction comprising the updated tool configuration to the other tool devices of the plurality of tool devices for endorsement;
receiving an endorsed transaction indicating that a majority of the other tool devices have endorsed the updated tool configuration;
transmitting the updated tool configuration to the tool device for use in construction of the semiconductor device.

16. The non-transitory computer readable storage medium of claim 15, wherein the updated tool configuration comprises:

changes to one or more of:
recipes, machine constants, control limits and consumables.

17. The non-transitory computer readable storage medium of claim 15, wherein the tool device comprises:
a processor, a memory, a scanner, and sensors.

18. The non-transitory computer readable storage medium of claim 15, wherein the one or more instructions further cause the processor to perform:
comparing the current tool configuration to another current tool configuration of another tool device at a remote location;
determining any differences between the current tool configuration and the another current tool configuration;
creating the updated tool configuration based on content of the current tool configuration and the another current tool configuration; and
transmitting the update tool configuration to the tool device and the another tool device.

19. The non-transitory computer readable storage medium of claim 15, wherein the one or more instructions further cause the processor to perform:
receiving a private key and a public key pair from a user identifier associated with the tool device; and
accessing the user identifier with the private key and public key pair to identify tool configuration parameters comprising recipes and parameters associated with operation of the tool device, wherein the tool configuration parameters are digitally signed by the private key and public key pair.

20. The non-transitory computer readable storage medium of claim 15, wherein the one or more instructions further cause the processor to perform:
executing the smart contract prior to operating the tool device;
responsive to executing the smart contract, identifying changes to the current tool configuration from a blockchain transaction;
updating the current tool configuration based on the changes identified;
identifying an error during the construction of the semiconductor devices via a sensor of the tool device;
creating a new blockchain transaction comprising the error and the changes identified; and
storing the new blockchain transaction in the blockchain.

* * * * *